United States Patent [19]

Maniere

[11] 4,093,940

[45] June 6, 1978

[54] SYSTEM AND EQUIPMENT FOR QUALITY CHECKING OF A DIGITAL CONNECTION CIRCUIT

[75] Inventor: Maurice Maniere, Conflans-Sainte-Honorine, France

[73] Assignee: Lignes Telegraphiques et Telephoniques, Paris Cedex, France

[21] Appl. No.: 768,782

[22] Filed: Feb. 15, 1977

[30] Foreign Application Priority Data

Feb. 27, 1976 France .................................. 76 05615

[51] Int. Cl.² ................................................ G08C 25/00
[52] U.S. Cl. ........................ 340/146.1 E; 179/175.3 R
[58] Field of Search ................................. 340/146.1 E; 179/175.3 R, 175.3 F

[56] References Cited

U.S. PATENT DOCUMENTS

| B 394,088 | 1/1975 | Han | 340/146.1 E |
|---|---|---|---|
| 3,315,228 | 4/1967 | Futerfas et al. | 340/146.1 E |
| 3,491,338 | 1/1970 | Malloy | 340/146.1 E |
| 3,496,536 | 2/1970 | Wheeler et al. | 340/146.1 E |
| 3,596,245 | 7/1971 | Finnie et al. | 340/146.1 E |
| 3,760,354 | 9/1973 | Ginn | 340/146.1 E |
| 3,904,861 | 9/1975 | McNamara | 340/146.1 E |
| 4,022,988 | 5/1977 | Lentz et al. | 179/175.31 R |

Primary Examiner—Charles E. Atkinson

[57] ABSTRACT

A system for quality checking of a digital connection circuit using a telephone line. Its principle resides in alternately and repetitively transmitting a check message followed by a quality character from one to the other of two similar equipments respectively located at the ends of the circuit. The quality character takes account of the results of the checking effected by the corresponding equipment when it receives the last previously transmitted check message. The latter message further includes a $n$ times repeated synchronization character and a pseudo-random series of $p$ binary signals and is immediately followed by a quality character which is stored and displayed by the receiving equipment which operates at the considered time.

6 Claims, 6 Drawing Figures

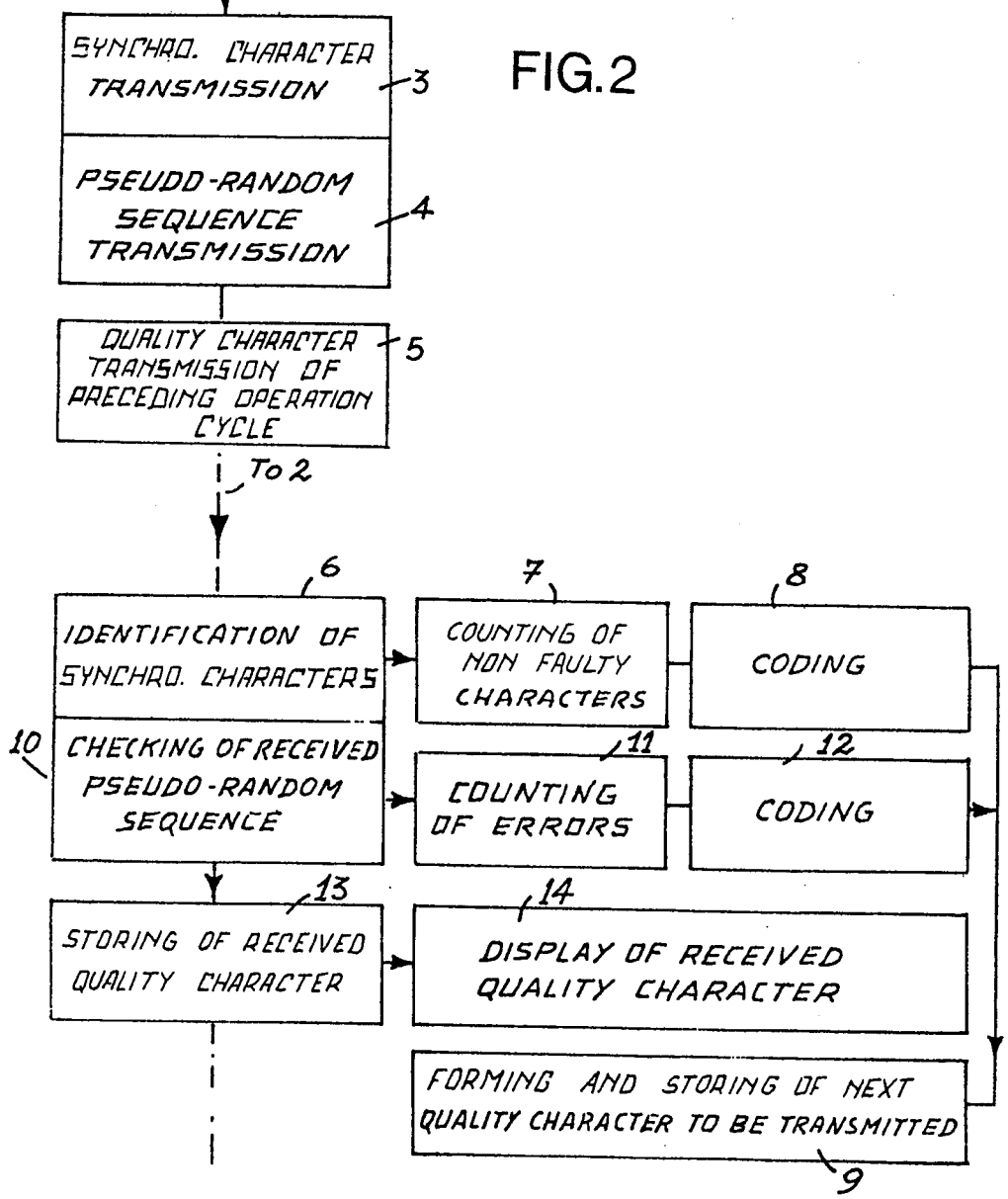

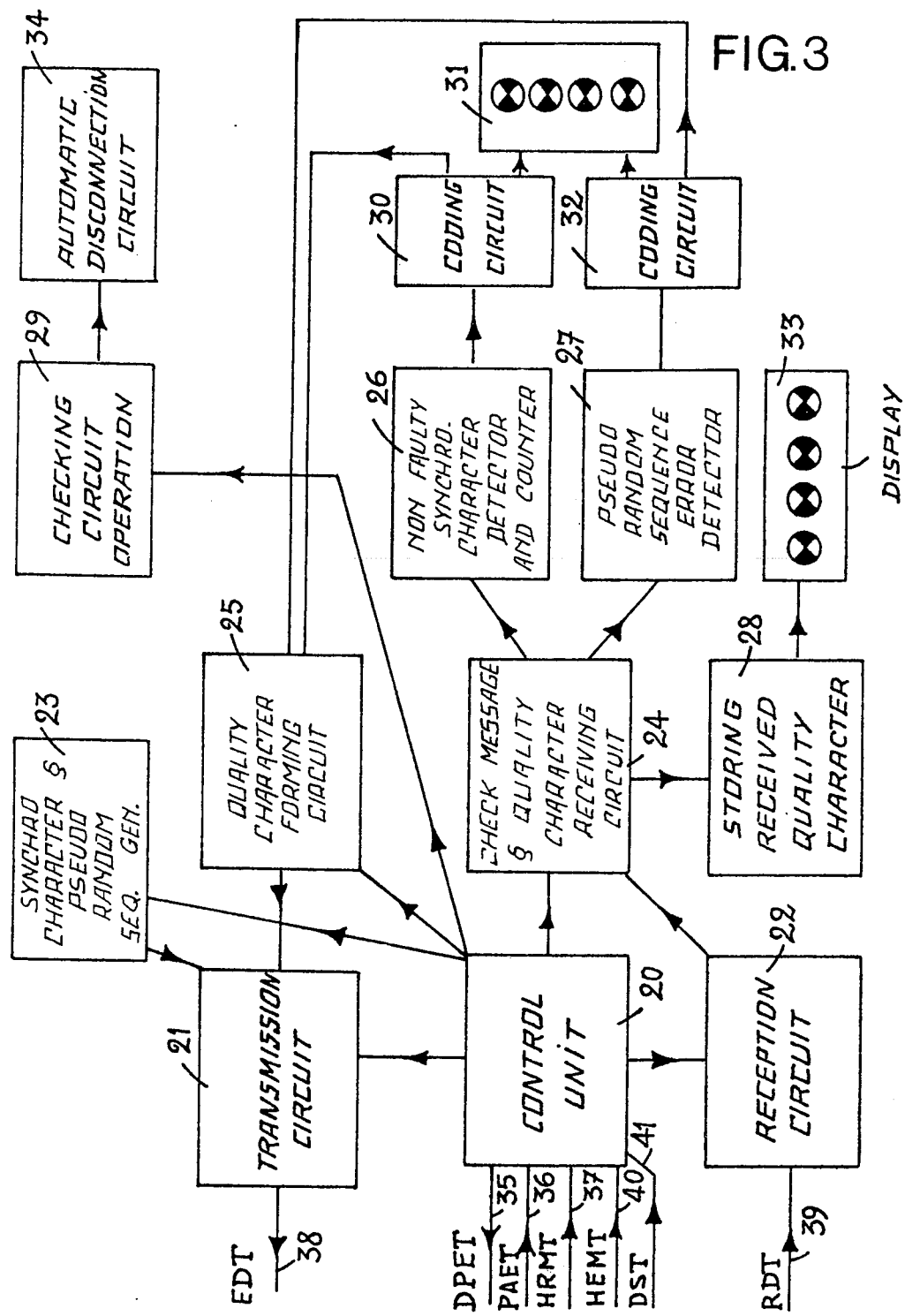

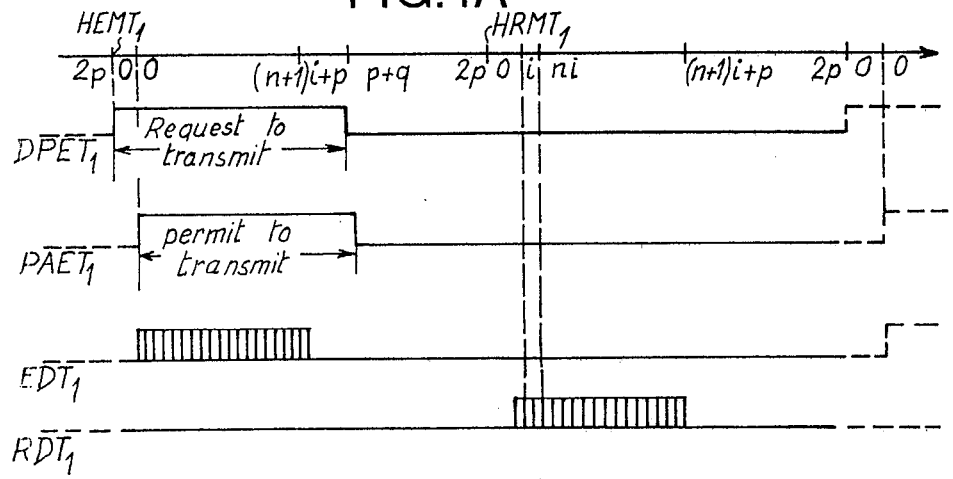
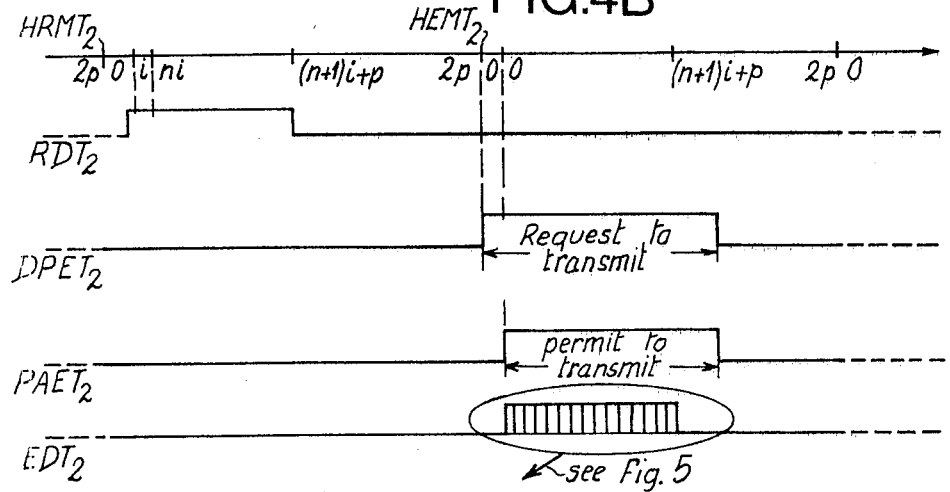
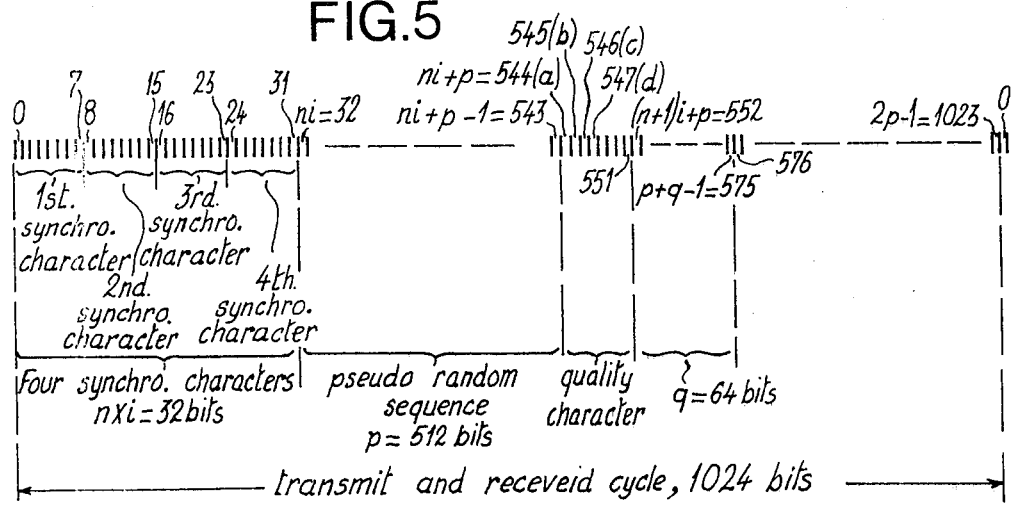

SYSTEM AND EQUIPMENT FOR QUALITY CHECKING OF A DIGITAL CONNECTION CIRCUIT

CROSS-REFERENCE TO RELATED APPLICATION

The Applicant hereby makes cross-reference to his French Patent Application Ser. No. 76-05615 filed Feb. 27, 1976 and claims priority thereunder following the provisions of 35 USC 119.

BACKGROUND OF THE INVENTION

1. Field of the Invention

The invention relates to a system for checking the quality of a digital connection made by means of a telephone circuit.

It is known to check the quality of a digital connection by transmitting a check message at one end of a telephone circuit using this connection and by comparing the message received at the other end with the check message and counting the errors. The same operations are repeated in the opposite direction after the connection is made.

2. Description of the Prior Art

French Patent Specification No. 2,130,063 filed on Dec. 10, 1971, by the so-called ALITALIA Company describes a device for making a check of the mentioned kind. FIG. 1 of the said Specification, which is also used as FIG. 1 of the present Application, shows a digital link circuit M between ends A and B, comprising a transmission line and two modems (modulator-demodulators).

In order to check the quality of the connection in FIG. 1 two identical devices 1 and 2 each comprising a transmitter $STT_1$ or $STT_2$ and a receiver $TR_1$ or $TR_2$ are connected to the ends A and B of a telephone circuit. The devices are put into operation by an operator, e.g. operating at end A, who causes the check message to be transmitted. The device at end B compares the received message, bit by bit, with the simultaneously-produced check message. The first error results in a stoppage in the comparison in progress in the device at end B of the circuit, so that the operator can note the error. Next, the operator restarts the device. Correct transmission of the check message in one direction causes transmission of the same message in the opposite direction, and so on.

In the event of transmission errors, however, the devices described in the above cited patent require the operator to make certain that the error is systematic. Such an operation is slow, since it requires manual intervention. Stoppage of the device as soon as a received bit is incorrect entails the necessity that a signal returning to the beginning of the message, for the purpose of resetting the device, be transmitted from the end of the circuit where the check was made to the end where the check message was transmitted.

The invention relates to a system for checking the quality of a digital connection link whereby the quality can be ascertained at each end of the telephone circuit constituting the said link.

SUMMARY OF THE INVENTION

The invention relates to a system for checking the quality of a digital connection link between two stations whereby a check message stored in the two stations is repeatedly transmitted by a first device connected to one end of the telephone circuit, the message being received by a second device which is identical with the first and connected to the other end of the circuit and vice versa, the operation of the first and second devices being periodically switched over, characterized in that the check message comprises a synchronization character having $i$ bits repeated $n$ times in succession and a pseudorandom sequence of $p$ bits, and is immediately followed by a quality character stored and displayed by the device which receives it.

According to an essential feature of the system of the invention, the quality character is built by means of the following method operations, which are performed during the reception of the check message formng part of the just preceding operating cycle:

Identification of the synchronization characters among the data at the beginning of the check message received from the distant device;

Counting the number of identified synchronization characters at a counter at the local device;

Coding a first number resulting from the said counting in a first number coder of said local device;

Storing the first coding result;

Comparing the received pseudo-random sequence received in the local station from the distant station with the sequence stand in the local station; and counting the number of identical bits found in the resulting comparison;

Coding the last named identical bits number to form a second coding result; and

Storing the second coding result beside the first in order to form the quality character.

The arrangement according to the invention has a number of advantages, as follows:

The presence of synchronization characters in the check message repeated a number of times means that the check device can be reliably synchronized; the transmission of the number of recognized characters ensures that the equipment is properly synchronized;

The pseudo-random binary sequence used in the check message is sufficiently long to reproduce nearly all the successive combinations of binary states which may be encountered during the transmission of data. The check made by the method according to the invention is therefore very thorough.

The quality character transmitted after the check message can be used to find the quality of transmission in both directions at each end of the circuit.

Other features and advantages of the invention will better appear from the following description of FIGS. 1 to 4, which are given by way of non-limitative illustration and in which:

BRIEF DESCRIPTION OF THE DRAWING

FIG. 1 shows a telephone circuit connected to two identical devices for checking the quality of the connection;

FIG. 2 shows the operations performed during a cycle by the check devices in the method according to the invention;

FIG. 3 is a block diagram of a device for working the method according to the invention;

FIGS. 4A and 4B show two cycles of counting time slots and the signals exchanged between the device and the modems terminating the link; and FIG. 5 depicts the data in the check message including the synchronization characters, the pseudo-random sequence and the quality character.

DESCRIPTION OF PREFERRED EMBODIMENTS

FIG. 1 has already been described.

FIG. 2 shows the sequence of operations for checking the quality of the connection according to the invention, performed by one of the devices 1 and 2 of FIG. 1.

Operation 3 is the transmission of the synchronization character, which is repeated a number of times in succession by device 1 to form the first part of the check message.

Operation 4 is the transmission of a pseudo-random sequence of bits forming the second part of the check message.

Operation 5 is the transmission of the quality character relating to the reception of the check message during the just preceding operation cycle.

The subsequent operations are performed during the reception of the check message transmitted by device 2.

Operation 6 is the identification of the synchronization characters; it is followed by a count of the identified characters (operation 7), coding the number obtained (operation 8) and storing the first result of such coding for forming part of the quality character to be transmitted during the next cycle (operation 9).

In operation 10, the received pseudo-random sequence is checked; this is followed by counting the number of errors identified (operation 11), coding the number obtained (operation 12) and storing the second result of the latter coding for forming another part of the quality character to be transmitted during the next cycle (operation 9).

Operation 13 is the acquisition and storage of the received quality character; it is followed by display of the same character (operation 14).

FIG. 3 is an operational diagram of each of the devices for working the system according to the invention, arranged at the ends of a circuit, the quality of which is to be tested. The diagram shows an instruction generator (control unit) 20 connected to a transmission circuit 21, a receiving circuit 22, to a check message and quality character receiver 24 and a circuit 29 for checking the operation of the device considered. The transmission circuit 21 is connected to a circuit 23 for generating synchronization characters and a pseudo-random sequence and to a circuit 25 for forming the quality character. Circuit 24 is also connected to a circuit 26 for detecting and counting the number of faulty identified synchronization characters, to a circuit 27 for checking the pseudo-random sequence received and adding up the errors, and to a circuit 28 for storing the quality character received. Circuit 26 is connected to a circuit 30 for coding the number of non faulty synchronization characters identified and for storing this number. Circuit 30 is connected on one side to the circuit 25 for forming the quality character and on the other side to a device for displaying the stored number. Circuit 27 is connected to a circuit 32 for coding the number of errors detected in the pseudo-random sequence received and for storing the result of the latter coding. Circuit 32 is connected to circuit 25 and to device 31. Thus, the information from circuit 31 will be transmitted by circuit 21 during the next transmission cycle. A circuit 28 for storing the received quality character is connected to a disply circuit 33. Circuit 29 is connected to a circuit 34 for automatically disconnecting the device for working the method. The instruction generator 20 is also connected to the neighboring modem by the following elements:

Conductor 35, which supplies the modem with request to transmit signals DPET;

Conductor 36 which supplies the instruction generator 20 with the permit to transmit signal (PAET);

Conductor 40, which supplies generator 20 with transmission clock signals HEMT;

Conductor 41, which supplies generator 20 with a "presence of detected signals" signal DST;

Conductor 37 which supplies generator 20 with reception clock signals HRMT reconstituted from the received signals. Transmission circuit 21 is connected to the modem by conductor 38 and supplies it with the check message followed by the transmission quality character EDT. The receiving circuit 22 is connected to the modem by conductor 39 and receives the transmitted data RDT.

Each of the check devices of the invention operates as follows:

The instruction generator (control unit) 20 receives from the modem clock signals HEMT via conductor 37. The signals are counted modulo $2p$ by the counter of generator 20, which can be reset to 0, to $i$ and to (ni) during operation, $i$ representing the number of bits contained in a character and $n$ the number of synchronization characters at the beginning of the message. The clock pulses or bit intervals from the counter in unit 20 are shown along the axis $HEMT_1$ in FIG. 4. At the beginning of a cycle the control unit 20 in device 1, for example, supplies the adjacent modem, via conductor 35, with a request to transmit signal DPET comprising the +1 state of a binary signal having a duration equal to $(p+q)$ bit intervals lasting from bit interval 0 to bit interval $(p+q-1)$. The signal is represented by the pulse diagram $DPET_1$, in FIG. 4. After a delay equal to a variable number of bit intervals, the modem delivers a permit to transmit signal (i.e. a voltage $+V$) to unit 20 via conductor 36. This signal is represented by pulse diagram $PAET_1$ in FIG. 4. The positive transition of signal $PAET_1$ initiates the transmission of the check message represented by pulse diagram $ED_1$ in FIG. 4 having $(ni+p)$ bit intervals, followed by the transmission of a quality character of $i$ bits formed after the reception of the check message for the preceding cycle, and resets the counter to zero. The signal $DPET_1$ returns to zero when $(p+q)$ bit intervals have elapsed since the resetting to zero of the counter, and the signal $PAET_1$, the reply of the modem to $DPET_1$, makes the same slightly afterwards. The counter continues to count the bit intervals. However, the beginnings of two request to transmit signals $DPET_1$ are separated by a duration equal to $4p$ bit intervals so that device 2 has a transmission time equal to that of device 1. FIG. 4 shows the information of the counter in device 2 along axis $HEMT_2$ and also shows pulse diagrams $RDT_2$, $DPET_2$, $PAET_2$ and $EDT_2$, to which the same remarks apply as to the corresponding pulse diagrams for device 1.

Operation 3 in the system of the invention is performed jointly by control unit 20, circuit 23 and circuit 21. To this end, unit 20 counts (ni) bit intervals from bit interval 0 to bit interval (ni−1) during which it unblocks the output of circuit 23, and the synchronization characters stored therein are transmitted by circuit 21 to the modem (FIG. 3).

Operation 4 is carried out jointly by control unit 20, circuit 23 and circuit 21. The previously-mentioned pseudo-random sequence of p bits is formed by circuit 24, on receipt of an enabling signal delivered by unit 20 between the $(ni)$ and $(ni+p-1)$ bit intervals. This sequence is transmitted to the modem by circuit 21.

Operation 5 is carried out by unit 20, the circuit 25 for forming and storing the quality character, and circuit 21. During the bit intervals $[(n+1)i+p-1]$ to $(ni+p-1)$, generator 20 enables the transmission of the quality character delivered by circuit 25 to circuit 21.

Device 1 does not transmit any signal between the bit interval of rank $[(n+1)i+p]$ and the $(2p-1)$ rank bit interval and during the $2p$ subsequent bit intervals. During the same time, device 2 transmits a request to transmit $DPET_2$ to the modem connected thereto, until the counter associated with its instruction generator passes through 0, and the part of the checking cycle described hereinbefore with reference to device 1 is repeated in identical manner in device 2. As a result, device 1 receives the signals represented by pulse diagram $RDT_1$ in FIG. 4.

Operation 6 in the system according to the invention begins with the reception of data by circuit 22 and the counting by generator 20 of the bit intervals corresponding to the synchronization characters. When the first synchronization character has been correctly recognized, the counter associated with generator 20 is reset to $i$ and, at the end of the reception of the $n^{th}$ synchronization character, the counter is reset to $(ni)$, as shown along axis $HRMT_1$ on FIG. 4. In addition, unit 20 identifies the synchronization characters.

Operation 7 (counting the identified characters) is performed by circuit 26.

Operation 8 (coding the number obtained) is performed in circuit 30 and operation 9 (storage) is performed in circuit 25, which is thus used to form the quality character.

Operation 10 (checking the pseudo-random sequence received) is carried out jointly by circuits 22, 24 and 27 during the bit intervals of ranks (ni) to $(ni+p-1)$. Unit 20 enables the formation of the pseudo-random sequence in circuit 24 so as to compare it in circuit 27 with the received sequence delivered by circuit 22. This check is made from next to next bit interval.

Operation 11 (counting errors) is also performed in circuit 27, which comprises a shift register.

Operation 12 (coding the number obtained) is performed in circuit 32, and the result of coding is displayed in circuit 31. The result of coding is stored in circuit 25, where the arrival of the latter result stops the formation of the quality character and forms part of operation 9, which also comprises the storage of the quality character until the time when it is transmitted.

Operation 13 (storing the received quality character) is carried out in circuit 28 by generator 20 during the bit intervals of ranks $(ni+p)$ to $[(n+1)i+p-1]$.

Operation 14 (displaying the received quality character) is carried out in circuit 33.

If there is a defect in the transmission link or the modem at one end of the link, the check device at the other end does not receive any DST signal in reply to its message. The circuit 29 controlling the operation of the device adds up the number of successive absences of reply. When the number is equal to several units, circuit 34, actuated by circuit 29, disconnects the check device and reconnects the receiver which is normally in series with the modem.

By way of non-limitative example, a device for working the system according to the invention was built, operating with the following parameters:

The number $i$ of bit intervals per character was equal to 8;

The number $n$ of synchronization characters was 4;

The number $p$ of bit intervals in the pseudo-random sequence was 512;

The number of bit intervals $(p+q)$ was 576 whereby $q=64$;

The number of bit intervals $(ni+p)$ was 544;

The number of bit intervals $(n+1)$ $i+p$ was 552;

The permitted number of successive absences of a reply to the check message was 3. Above this value, the device for checking the quality of the link was disconnected and automatically replaced by the conventional receiver.

The system for coding the identified synchronization characters used two binary digits $a$ and $b$ having values given in the following table:

| Number of identified characters | a | b |
|---|---|---|
| 0 | 0 | 0 |
| 1, 2, 3 | 1 | 0 |
| 4 | 1 | 1 |

The system for coding the number of errors identified in the pseudo-random sequence used two binary digits $c$ and $d$ having values given in the following table:

| Number of errors identified | c | d |
|---|---|---|
| 0 | 0 | 0 |
| 1 to 4 | 1 | 0 |
| 5 or more | 1 | 1 |

FIG. 5 represents the check message with its four synchronization characters of 8 bits in bit positions Nos. 0 to $ni-1=31$, the 512-bit pseudo random sequence in bit positions Nos. 32 to $(ni+p-1)=543$, the quality character of 8 bits (only four of which $a$, $b$, $c$, $d$ are significative) in bit positions Nos. 544 to 551. The bit positions 552 to 1023 are unused.

What I claim is:

1. A system for checking the quality of a digital connection circuit comprising:

a first device including transmitting and receiving means connected to the first end of said circuit for respectively transmitting a check message and a quality character sent in a given direction of said circuit under test during transmit cycles assigned to said first device and receiving a check message and a quality character sent in the other direction of said circuit under test during receive cycles assigned to said first device;

a second device identical to the first device including transmitting and receiving means connected to the second end of said circuit for respectively transmitting a check message and a quality character sent in said other direction of said circuit under test during transmit cycles assigned to said second device and coinciding with the receive cycles assigned to the first device and receiving a check message and a quality character sent in the given direction of said circuit under test during receive cycles assigned to said second device and coinciding with the transmit cycles assigned to the first device;

control units respectively connected to the ends of said digital connection circuit including means for periodically switching said first and second devices to thereby reverse transmission and reception;

each of said control units including means for respectively generating, transmitting and receiving a synchronization character having $i$ bits repeated $n$ times and forming the first part of said check message and further including means for respectively generating, transmitting and receiving a pseudo-random sequence of $p$ bits, forming the second part of said check message, each covering one further bit interval immediately following said synchronization character;

store means connected to said control units for storing said received synchronization character, pseudo-random sequence and quality character;

error detector means and coding means connected to said store means, deriving from the errors in said received synchronization characters and pseudo-random sequence a coded result forming the quality character;

display means for displaying the quality character received in each of said device during the receive cycle wherein it is received;

and means for adding said quality character to the check message transmitted by each of said device during the transmit cycle following that wherein it is received.

2. A method for checking the quality of a digital connection circuit provided with a first and a second devices connected to the ends thereof having means for alternately transmitting and receiving a check message and a quality character on the circuit under test said method comprising the following steps:

(1) alternately generating in each of said devices acting as a transmitter device a synchronization character having $i$ bits repeated $n$ times and forming the first part of said check message, a predetermined subsequent pseudo-random sequence of $p$ bits forming the second part of said check message and a quality character incorporated at the end of the said check message;

(2) alternately receiving in each of said devices acting as a receiver device said repeated synchronization character, said transmitted subsequent pseudo-random sequence and said quality character;

(3) identifying in identifying means connected to said first and second devices the non faulty synchronization characters in the check message received in each of said devices;

(4) counting in first counter means connected to said identifying means the number of the non faulty synchronization characters identified in step (3);

(5) coding in first coder means connected to said first counting means the number of the non faulty identified synchronization characters counted in step (4);

(6) storing the result of said first coding in step (5);

(7) comparing in comparator means connected to said first and second devices the received pseudo-random sequence to the predetermined pseudo-random sequence;

(8) counting in second counting means connected to said comparator means the number of identical bits resulting from comparison in step (7);

(9) coding in second coding means connected to said second counting means the number of the identical bits counted in step (8);

(10) storing the result of said second coding in step (9) beside the result of said first coding to form the quality character;

(11) displaying said quality character in the device wherein it is stored and adding the quality factor to the check message at the end thereof to be forwarded to the other device together with said check message.

3. A system for checking the quality of a digital connection circuit comprising:

a first device incluing a modem connected to the first end of said circuit, transmitting and receiving means connected to said modem for respectively transmitting through said modem a check message and a quality character sent in a given direction of said circuit under test during transmit cycles assigned to said first device and receiving through said modem a check message and a quality character sent in the other direction of said circuit under test during receive cycles assigned to said first device;

a second device identical to the first device including a modem connected to the second end of said circuit, transmitting and receiving means connected to the second end of said circuit for respectively transmitting through said modem a check message and a quality character sent in said other direction of said circuit under test during transmit cycles assigned to said second device and coinciding with the receive cycles assigned to the first device and receiving through said modem a check message and a quality character sent in the given direction of said circuit under test during receive cycles assigned to said second device and coinciding with the transmit cycles assigned to the first device;

control units respectively connected to the ends of said digital connection circuit each including a transmission bit interval generator controlling the modem, a reception bit interval generator controlled by the modem, a synchronization character generator, a faulty synchronization character detector and counter, a pseudo-random sequence generator, a pseudo-random sequence error detector, a quality character forming circuit, a quality character display means, a coding circuit having its inputs connected to said faulty synchronization character detector and counter and to said pseudo-random sequence error detector and its output to said quality character forming circuit, means controlled by said transmission bit interval generator for sequentially connecting to the modem during a transmit cycle the synchronization character generator from bit interval No. 0 to bit interval No. $(ni-1)$, the pseudo-random sequence generator from bit interval No. $ni$ to bit interval No. $(ni+p-1)$ and the quality character forming circuit from bit interval No. $ni+p$ to bit interval $[(n+1)\,i+p-1]$, means controlled by said reception bit interval generator for connecting to the modem during a receive cycle the faulty synchronization character detector and counter from bit interval No. 0 to bit interval No. $(ni-1)$, the pseudo-random sequence error detector from bit interval No. $ni$ to bit interval No. $(ni+p-1)$ and the quality character display means from bit interval No. $(ni+p)$ to bit interval No. $[(n+1)i+p-1]$.

4. A system for checking the quality of a digital connection circuit as claimed in claim 1 in which $n = 4, i = 8$ and $p = 512$ 5. A system for checking the quality of a digital connection circuit as claimed in claim 1 further comprising means for disconnecting the control units from the ends of said digital connection circuit when the receiving means of a device receives a predetermined number of consecutive check messages deprived of a quality character at the end thereof.

6. A system for checking the quality of a digital connection circuit as claimed in claim 3 wherein said transmission bit interval generator and said reception bit interval generator comprise reset to zero means modulo $2p$ for controlling the means for periodically switching the first and second devices to thereby reverse transmission and reception.

* * * * *